Jan. 19, 1937.  R. F. BRADY  2,068,480
PROJECTION PRINTER
Filed April 30, 1934  3 Sheets-Sheet 1

INVENTOR
RAYMOND F. BRADY
BY
ATTORNEY

Jan. 19, 1937.  R. F. BRADY  2,068,480
PROJECTION PRINTER
Filed April 30, 1934  3 Sheets-Sheet 3

Inventor
Raymond F. Brady
By
Attorney

Patented Jan. 19, 1937

2,068,480

UNITED STATES PATENT OFFICE 2,068,480

PROJECTION PRINTER

Raymond F. Brady, Collingswood, N. J., assignor to Radio Corporation of America, a corporation of Delaware Application April 30, 1934, Serial No. 723,232

2 Claims. (Cl. 88—24)

This invention relates to photographic projection printers, and more particularly to the variety thereof adapted for the projection printing of soundtrack from sound motion picture film upon film. It is particularly adapted for the reduction printing of soundtrack from 35 mm. standard film to 16 mm. standard film.

In such projection printing it is necessary to secure perfectly uniform movement of the film past the printing point in order to avoid variations in exposure which produce corresponding noises upon reproduction, and in order to avoid relative movement of the several films which would produce a blurring of the image. My invention pertains particularly to a mechanism for accomplishing such uniform movements of the film either at the same speed or at relative speeds which are proportional to the degree of reduction to be secured.

One object of my invention is to provide means for moving a plurality of films past a printing point at a uniform speed.

Another object of my invention is to provide apparatus for moving a 35 mm. sound record film past a printing point at a uniform speed and for moving a smaller film past the printing point at a uniform proportional speed.

Another object of my invention is to provide a device of the class described which is capable of performing the aforesaid objects and which can be manufactured at a minimum cost.

Other and ancillary objects of my invention will be apparent to those skilled in the art from an inspection of the accompanying drawings and a reading of the appended specification.

Figure 1:
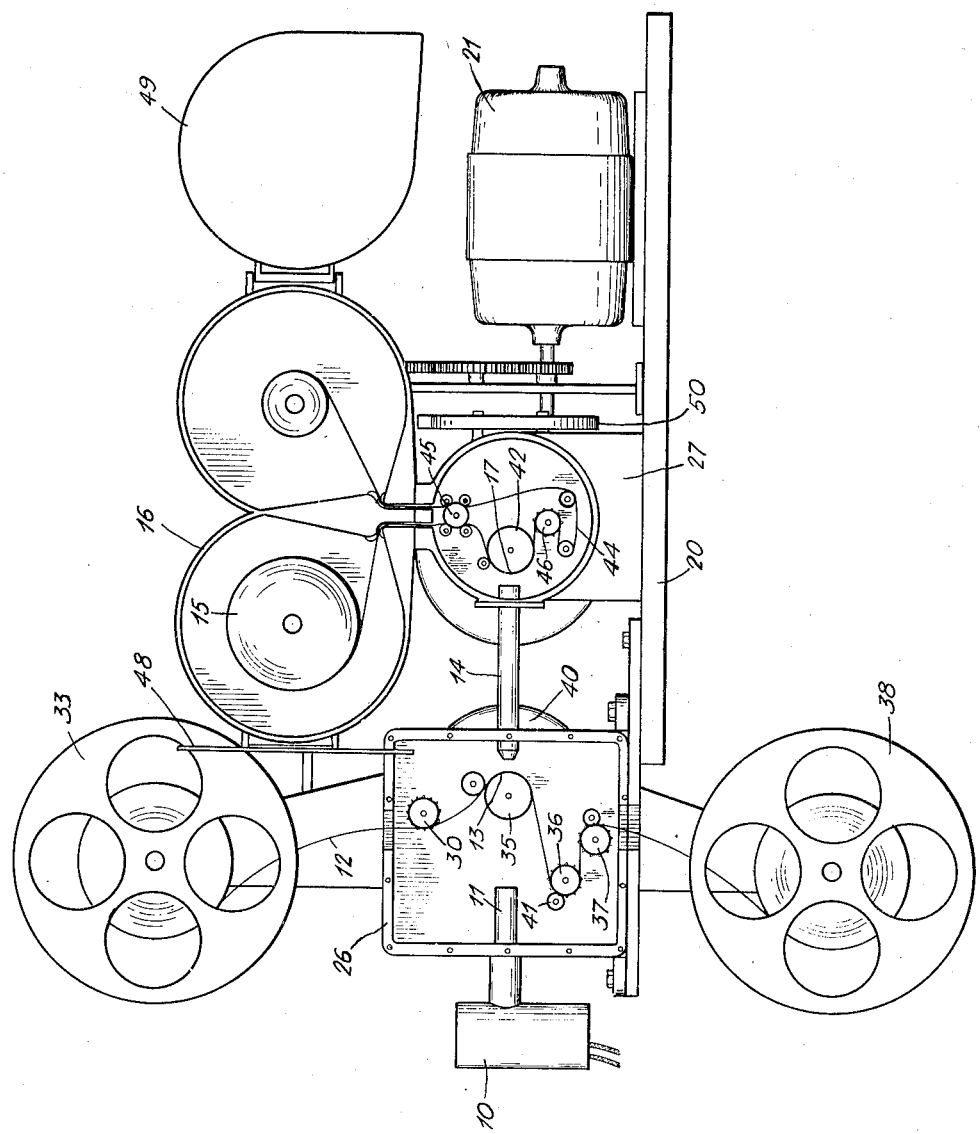
Fig. 1 is a view of my improved projection printer from the operating side with the several doors and covers thereof open or removed to show the mechanism.

Referring first to Fig. 1: I provide a lamphouse 10 of any convenient type which houses a printing lamp of any convenient or usual type, and which has appended to it an optical system 11 which serves to concentrate the light upon the film 12 at the point 13 in alignment with the projection optical system 14. Film stock 15 is fed in a manner which will be later described from the magazine 16 past the printing point 17 and back into the magazine.

The optical system 14 projects upon the film stock at 17 an image of the film passing the point 13, and this image, due to the illumination furnished from the light source 10 is of sufficient intensity to produce an adequate exposure of the film stock 15 at the printing point.

The entire mechanism is mounted upon a base plate or other suitable support 20 and is driven by an electric motor or other appropriate constant speed driving mechanism 21 which is also mounted upon the base plate.

Figure 2:
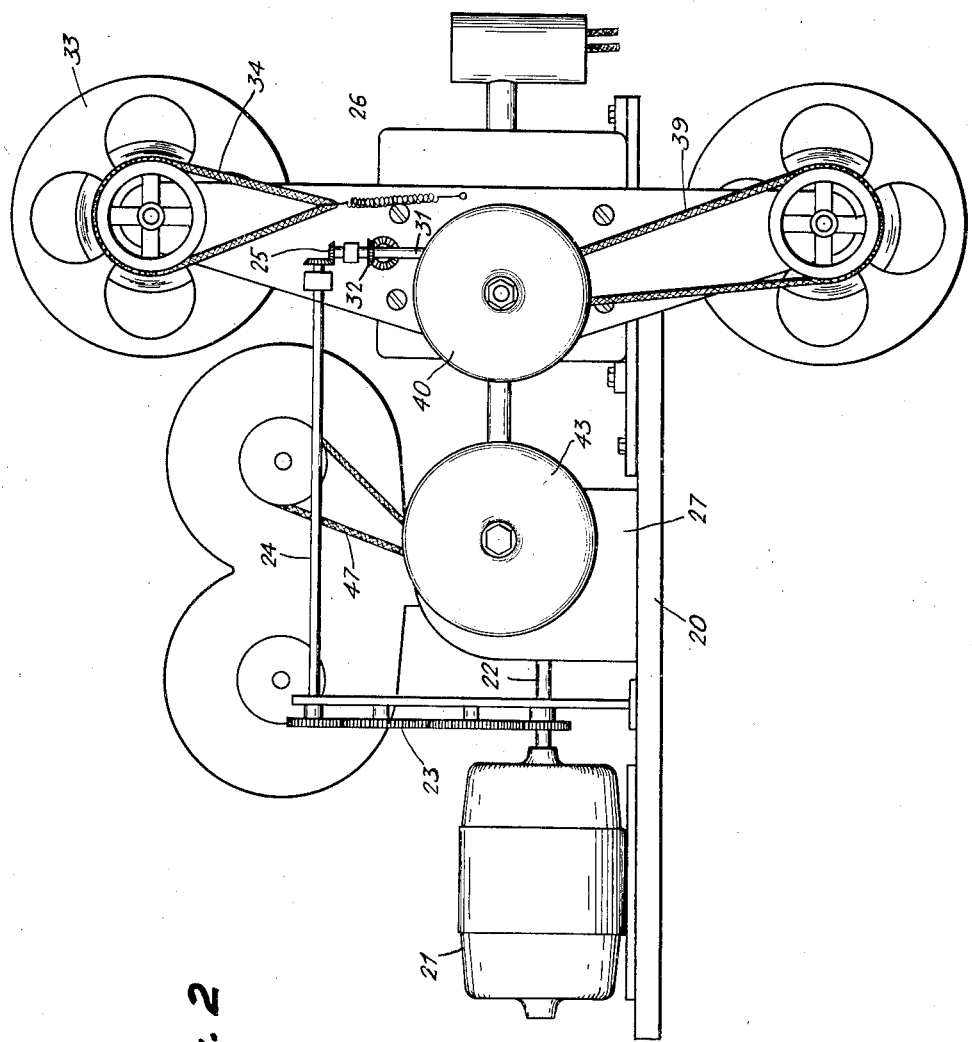
Fig. 2 is a view of my improved projection printer from the rear or driving side.
Figure 3:
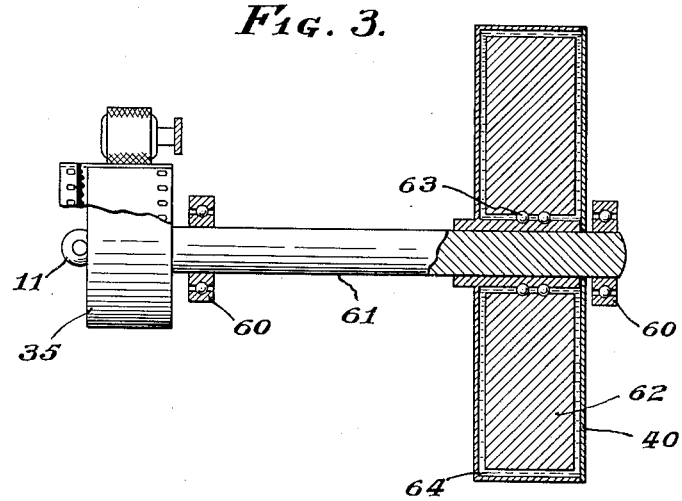
Fig. 3 is a longitudinal section through the rotary stabilizer 40, showing the drum in elevation as viewed from the center of the machine.
Figure 4:
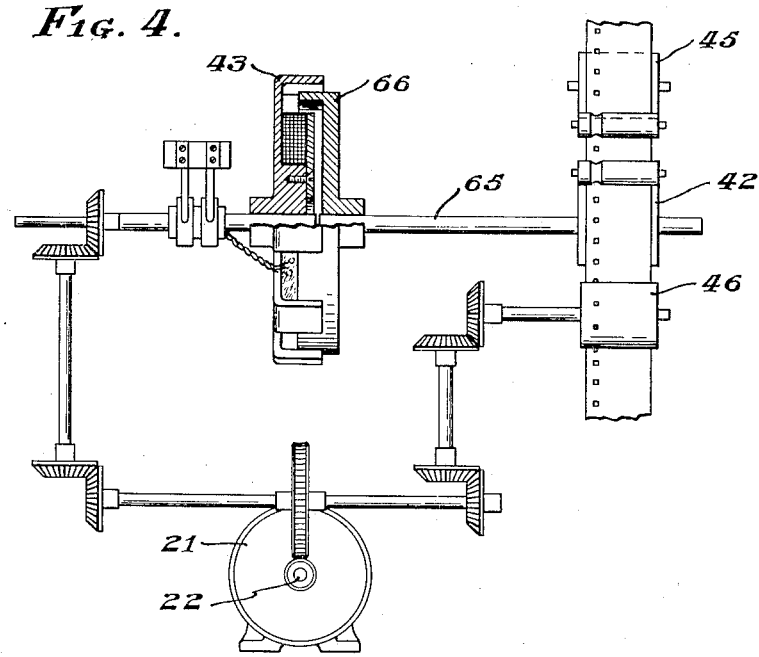
Fig. 4 shows the magnetic drive 43 in section as connected to the film drum 42.

As will be more readily apparent from Fig. 2, the motor drives the portion of the mechanism feeding the film stock 15 through the shaft 22, while it drives the portion of the mechanism feeding the negative or diapositive film 12 through the gear train 23, the shaft 24 and the bevel gears 25.

Hereinafter for the sake of convenience, the portion of the apparatus generally indicated at 26 which feeds the film to be printed from past the reproduction point will be referred to as the projection head, while the portion of the device generally indicated at 27 which feeds the film stock 15 past the printing point will be referred to as the printing head.

The projection head 26 is constructed to feed standard 35 mm. film, and for this purpose I prefer to use the film feed mechanism more specifically described and claimed in the patent of E. W. Reynolds No. 2,013,109 issued September 3, 1935 and the patent of Loomis and Reynolds No. 2,019,147 issued October 29, 1935. The said mechanism includes a sprocket 30 which is driven from the shaft 31 by the bevel gears 32 and which serves to pull the film from the reel 33 against the action of the brake 34 which prevents over-running of the reel. At the projection point the film passes over a drum 35 from the edge of which the soundtrack extends unsupported into the beam of light in the manner described and claimed in the Cawley Patent 1,825,438. The film is pulled over the drum 35 by the sprocket 36 which is driven from the shaft 31 in the same manner as is the sprocket 30. After leaving the sprocket 36, the film passes over the sprocket 37 and thence to the takeup reel 38 which is driven by the belt 39. The sprocket 37 serves to permit the film to pass to the reel 38 at a uniform speed and prevent irregularities in the motion of the reel being transmitted to the film at the sprocket 36, and thereby to the film at the point 13 as is described in Rose Patent 1,841,382.

The drum 35, as before stated, is driven by the pull upon the film by the sprocket 36. This drum is mounted upon ball bearings 60 as described in the said Reynolds application, and the shaft 61 carrying the drum has mounted upon its other end a device 40 which is generally referred to as a "rotary stabilizer". This device consists of a momentum member 62 rotating freely upon ball-bearings 63 within the casing shown, and coupled to the said casing by a viscous fluid 64 such as oil. The momentum member 62 is thereby aperiodically coupled to the drum 13 and serves to stabilize the motion thereof, while the position of the pressure roller 41 upon the sprocket 36 permits the film 12 to rise slightly from the sprocket by its own elasticity, and to thereby form a slight loop which serves to absorb irregularities in the motion of the film.

It will be apparent that the projection head 26 thus serves to move the film 12 past the projection point 13 at a uniformly constant speed.

Due to the fact that 16 mm. film has only one sprocket hole per picture, whereas the 35 mm. film before referred to has four sprocket holes per picture, and due to the narrower width and therefore greater flexibility of the 16 mm. film, I have found that a different mechanism is desirable for moving a film of reduced size, such as the 16 mm. standard film 15 past the printing point 17. Accordingly, the printing head 27 is constructed in the manner described and claimed in Kellogg Reissue Patent 19,270.

In accordance with the teachings of the said patent, the drum 42 which carries the film 15 past the printing point 17 is driven through a mechanism generally indicated at 43 which comprises a magnet at 43 which is driven from the shaft 22 at a slightly greater speed than that at which the drum 42 is to rotate within this magnet. Connected to the shaft 65 of the drum 42 there is provided an electrically conductive disc or ring 66 which is driven through the eddy currents induced therein by the rotation of the magnets 43, thereby maintaining the portion of the film at 44 under a very slight tension whereby the motion of the film past the point 17 is at very uniform speed due to the said magnetic drive but is, nevertheless, under the control of the sprocket 45 which is driven directly through gearing from the motor 21 and which therefore determines the average speed of motion of the film 15 past the point 17. The sprocket 45 also serves the same purpose as the sprocket 37 in the projection head.

The magazine 16 for retaining the unexposed film stock and into which the exposed film stock is wound through the action of the belt 47 is provided with appropriate closures 48 and 49, and the printing head 27 is provided with an appropriate door 50 so that after the machine is threaded, these doors may be closed and the device operated in a lighted room. If the room is but dimly lighted or if the device is operated in the usual darkened printing room, the projection head 26 need not be covered, but if the device is to be run in a fully illuminated room, the cover may be attached to the head 26 by means of the screw-holes shown in order to prevent the entrance of stray light in the optical system 14.

It will be apparent that I have provided an apparatus which will move two different sized films having different sprocket hole perforations at uniform and relatively proportional speeds, thereby securing a uniform printing action, and it will be further apparent that I have accomplished this result by a mechanism which can be constructed at a relatively low cost and which is reliable in its operation.

Having thus described my invention, I claim:

1. Apparatus of the class described comprising a sprocket for feeding a photographic sound record film past a printing point, a drum for supporting the film at the printing point and adapted to be driven by the film, a flywheel, and continuously and aperiodically yieldable means coupling and driving said flywheel from said drum, means for directing light past said drum through the film thereon to a second film, a second drum for supporting said second film, sprockets for feeding film to and from said second drum, means for driving all of said sprockets and said second drum, and continuously and aperiodically yieldable means coupling said second drum to said driving means.

2. Apparatus of the class described comprising a sprocket for feeding a photographic sound record film past a printing point, a drum for supporting the film at the printing point and adapted to be driven by the film, a flywheel, and continuously and aperiodically yieldable viscous means coupling said flywheel to said drum, means for directing light past said drum through the film thereon to a second film, a second drum for supporting said second film, sprockets for feeding film to and from said record drum, means for driving all of said sprockets and said second drum, and continuously and aperiodically yieldable magnetic means coupling said second drum to said driving means.

RAYMOND F. BRADY.